(12) United States Patent
Heidloff et al.

(10) Patent No.: US 8,458,252 B2
(45) Date of Patent: Jun. 4, 2013

(54) MINIMIZING THE TIME REQUIRED TO INITIATE AND TERMINATE AN INSTANT MESSAGING SESSION

(75) Inventors: Niklas Heidloff, Salzkotten (DE); Michael R. O'Brien, Westford, MA (US); Shruti Kumar, Littleton, MA (US)

(73) Assignee: International Business Machines Corporation, Armonk, NY (US)

( * ) Notice: Subject to any disclaimer, the term of this patent is extended or adjusted under 35 U.S.C. 154(b) by 404 days.

(21) Appl. No.: 11/611,785

(22) Filed: Dec. 15, 2006

(65) Prior Publication Data

US 2008/0147795 A1 Jun. 19, 2008

(51) Int. Cl.
G06F 15/16 (2006.01)
G06F 15/177 (2006.01)
G06F 3/48 (2006.01)

(52) U.S. Cl.
USPC ........... 709/204; 709/206; 709/207; 709/220; 715/781

(58) Field of Classification Search
USPC .............. 709/204, 206, 207, 220; 715/781
See application file for complete search history.

(56) References Cited

U.S. PATENT DOCUMENTS

| | | | |
|---|---|---|---|
| 5,691,708 A * | 11/1997 | Batchelder et al. | 340/7.29 |
| 6,807,566 B1 * | 10/2004 | Bates et al. | 709/206 |
| 2002/0173308 A1 | 11/2002 | Dorenbosch et al. | |
| 2003/0050865 A1 * | 3/2003 | Dutta et al. | 705/27 |
| 2004/0255041 A1 * | 12/2004 | Wen et al. | 709/231 |
| 2005/0027805 A1 | 2/2005 | Aoki | |
| 2005/0187781 A1 | 8/2005 | Christensen | |
| 2006/0007486 A1 * | 1/2006 | Tanimoto | 358/1.15 |
| 2006/0101021 A1 * | 5/2006 | Davis et al. | 707/9 |
| 2007/0005754 A1 * | 1/2007 | Horvitz et al. | 709/224 |
| 2007/0088793 A1 * | 4/2007 | Landsman | 709/207 |
| 2007/0266105 A1 * | 11/2007 | Wu et al. | 709/206 |

OTHER PUBLICATIONS

Barton, L., Cartoon print: "It's your boss. He wants to know why you're not at work", Punch Library, Jan. 16, 1991, <http://www.punchcartoons.com/m201/Barton,-Les/p3604/Cartoon-Print:-It's-your-boss.-He-wants-to-know-why-you're-no.../product_info.html>.*

* cited by examiner

*Primary Examiner* — Joon H Hwang
*Assistant Examiner* — John Isom
(74) *Attorney, Agent, or Firm* — David A. Dagg (57) ABSTRACT

A system for minimizing the time required to initiate and terminate an instant messaging session. An initial message in an instant messaging session is checked to determine whether it has any significant content. If the received initial message has insignificant content, then a non-intrusive notification is provided to the user, without changing the current focus in the user interface. A pre-composed response message may also be automatically transmitted to the initiating user, requesting that a more significant message be sent. When an initial message in an instant messaging session is received that is determined to have significant content, the user is promptly notified in a different manner, which may be intrusive such that the current focus of the user interface is changed to a new window or the like containing the newly initiated instant messaging session. Detection of instant messaging session termination by the local user triggers a period of special processing of received instant messages from other participants in the terminated instant messaging session. Instant messages received from other participants in the terminated session during this time period that are insignificant farewell messages are processed without disturbing the local user.

14 Claims, 5 Drawing Sheets

MINIMIZING THE TIME REQUIRED TO INITIATE AND TERMINATE AN INSTANT MESSAGING SESSION

FIELD OF THE INVENTION

The present invention relates generally to synchronous communication systems, such as instant messaging software systems, and more specifically to a method and system for minimizing the time required to initiate and terminate an instant messaging session.

BACKGROUND OF THE INVENTION

As it is generally known, instant messaging systems are software applications that enable the exchange of messages in a real-time communication session between two or more people over a communication network such as the Internet. Instant messaging is a synchronous communication technology, requiring all participants in a communication session to be logged onto their instant messaging service during the session. Also referred to as "chatting," instant messaging has become very popular for both business and personal use.

Instant messaging systems maintain and distribute the on-line status of users. Instant messaging client programs automatically set and/or enable users to set their on-line status to indicate that they are currently available for an instant messaging session ("on-line", "available", etc.), or that they are not currently available for an instant messaging session ("away from desk", "do not disturb", etc.). When a user has indicated that they are available for an instant messaging session, other users are informed of that user's availability, and thus understand that they can initiate an instant messaging session with that user. When an instant messaging session is initiated by an initiating user with a target user, the target user receives a notification, the specific type of which depends on the target user's preferences. One common type of notification is the generation of a pop-up dialog window generated immediately in the user interface of the target user.

In existing systems, because of the synchronous nature of instant messaging, when an instant messaging session is initiated, the target user is interrupted. At the time a session is initiated, the target user is often working on something else, but the newly generated instant messaging session window in the user interface requires the complete attention of the target user. The target user must accordingly immediately change contexts, and start thinking about something completely different from what they were working on.

A related problem is the habit many users have of initiating an instant messaging session with an initial message that includes little or no meaningful content. For example, many initial instant messaging session messages include only insignificant text consisting of "Hi", "Hello", "Are you there?", "Do you have a minute?", or the like. In these situations the target user is interrupted, and may be blocked from continuing with their work. The target user cannot continue with their real work, but cannot substantively respond to the instant messaging session initiator (other than by responding with more insignificant text, such as "Hi", "What's up?", etc.), since they don't know what the initiator of the session wants. The resulting delay before substantive communication can begin takes significant time, especially if the initiating user still needs to type in a whole paragraph of text for their first question after the target user responds to the initial insignificant message.

Another problem with existing systems arises when an instant messaging session is terminated. When a local user terminates a session, they often will enter a final, closing message including a relatively short term, expression and/or acronym used to express farewell such as "bye", "see ya", "ttyl" ("talk to you later"), "bfn" ("bye for now"), "thx" ("thanks"), or the like, and then immediately close the user interface window through which the session has been provided to them on their local client computer system. At this time, the user that terminated the session in this way typically desires to immediately turn their attention to another task. However, in existing systems, when one of the other participants in the just terminated instant messaging session sends a farewell message back to the local user, the local user's client computer system generates a visual alert to the local user indicating receipt of the farewell message. As a result, the local user must take an action in response to the alert, such as again closing an instant messaging session window. This series of events delays the local user from promptly turning their attention to a new task or resuming a task they were previously performing.

Given that instant messaging will continue to be used in many contexts, and that it will continue to cause interruptions of target users when instant messaging sessions are initiated, and delay users from turning their attention to other tasks when instant messaging sessions are terminated, it would be desirable to have a new system that minimizes the unnecessary time taken up during the initiation of a new instant messaging session resulting from the use of initial messages that lack significant content, and during the termination of an instant messaging session while insignificant farewell messages are exchanged.

SUMMARY OF THE INVENTION

To address the above described and other shortcomings of the prior art, a new method and system are disclosed for minimizing the time required to initiate and terminate an instant messaging session. In the disclosed system, an initial message in an instant messaging session is checked to determine whether it contains significant content. If the received initial message has insignificant content, then a non-intrusive notification is provided to the user. The non-intrusive user notification provided by the disclosed system may be user configurable. One example of a non-intrusive user notification includes visually displaying an icon or the like in the user interface, without changing the current focus in the user interface. Another example of a non-intrusive user notification is generation of a sound, also without changing the current user interface focus. Any specific type of non-intrusive user notification may be provided by the disclosed system in response to detection of a received initial instant message with insignificant content. In contrast, when an initial message in an instant messaging session is received that is determined to have significant content, the user is promptly notified in a different manner, which may be intrusive such that the current focus of the user interface is changed to a new window or the like containing the newly initiated instant messaging session.

During processing of a message determined to have insignificant content, the disclosed system may cause a pre-composed response message to be automatically transmitted to the initiating user. The specific response message that is automatically sent may be set up or selected by the user, and may, for example, inform the initiating user that the initial message was received, but that the target user desires that a more significant message now be sent, to which the target user will respond substantively.

The determination of whether a received initial message in an instant messaging session has insignificant content may be based on a number of pre-set and/or user configurable criteria. For example, the disclosed system may be embodied such that the number of words in an initial instant messaging session message are counted. If the number of words in the initial message does not meet or exceed a threshold value, then the message is determined to include an insignificant amount of content. Certain insignificant words may be excluded from the counting. Examples of such insignificant words that may be excluded include "Hi", "Hello", etc., and may be selected or defined by the user.

Determination of insignificant content in an initial instant message in an instant messaging session may also be based on the identity of the initiating user. In this way the target user can indicate that initial messages from one or more other specific users are to always be considered to have insignificant content. Conversely, the target user can indicate that initial instant messaging session messages from another set of users are to never be considered to have insignificant content. Similarly, in another embodiment of the disclosed system, the user is enabled to list those users to which insignificant content filtering is to be applied when those users send an initial instant message in a new instant messaging session.

Determination of insignificant content may further be based on previous session history. For example, if an initiating user has repeatedly used insignificant content messages to initiate more than some threshold number of instant messaging sessions in the past, then the disclosed system may enter the initiating user into a list of users from which initial instant messages are to be checked for insignificant content, or for which only non-intrusive instant messaging session notifications are to be provided when they initiate new instant messaging sessions.

The disclosed system may also count the number of insignificant content messages received from an initiating user when attempting to initiate an instant messaging session. In such an embodiment, if the number of insignificant content messages sent to initiate a single session exceeds a predetermined value, then an intrusive instant messaging session notification is generated to the target user.

The relationship between the target user and the initiating user in a hierarchy of users may also be used by the disclosed system to determine whether an initial instant message in an instant messaging system has insignificant content. For example, the relationship between the target user and the initiating user may be determined from the contents of a hierarchical directory of users, such as an LDAP (Lightweight Directory Access Protocol) directory or the like representing employees in a business organization. Such a hierarchical representation of users, may, for example, indicate the relationships between employees or other users within a business organization or the like. This feature can be used to cause initial instant messages received from initiating users at higher levels in the user hierarchy than the target user to always result in an intrusive instant messaging session notification to the target user.

In another aspect of the disclosed system, the time taken to terminate an instant messaging session is also reduced. To reduce the time taken to terminate an instant messaging session, the disclosed system may be embodied to detect instant messages containing only insignificant farewell terms, expressions, and/or acronyms (e.g. "bye", "see ya", "ttyl" (talk to you later), "bfn" (bye for now), "thx" (thanks), or the like), and to operate in response to such received insignificant farewell messages in a way that does not disturb the local user (e.g. by ignoring them). As a result, if the local user has previously closed the instant messaging session window containing the session for which the insignificant farewell message was received, no alert indication of receipt of the message (e.g. new instant messaging window, icon in the taskbar, etc.) is generated. Such system behavior may, in one embodiment, be defined through definition of one or more appropriate message processing rules by the local user.

In another aspect of the disclosed system, termination of an instant messaging session by the local user is detected (e.g. when the local user closes the user interface window providing the instant messaging session), causes the disclosed system to enter a "terminated by user" state for a predetermined and/or user configurable time period (e.g. a few seconds or minutes). During the "terminated by user" state, the disclosed system analyzes the content of instant messages received from participants in the just terminated instant messaging session, based on session termination logic, such as a set of session termination rules. The session termination logic used during the "terminated by user" state allows for checking for insignificant messages made up or including specified insignificant farewell terms, expressions, and/or acronyms, and for special handling in response to detection of such insignificant farewell messages. Such special session termination processing may include not counting insignificant farewell content towards a minimum message word count, generating a special termination related auto-response message, and/or other appropriate session termination related actions. Thus there is disclosed a new system for new system that minimizes unnecessary time taken up during the initiation and termination of an instant messaging session.

BRIEF DESCRIPTION OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings in which:

DETAILED DESCRIPTION OF EXEMPLARY EMBODIMENTS

Figure 1:
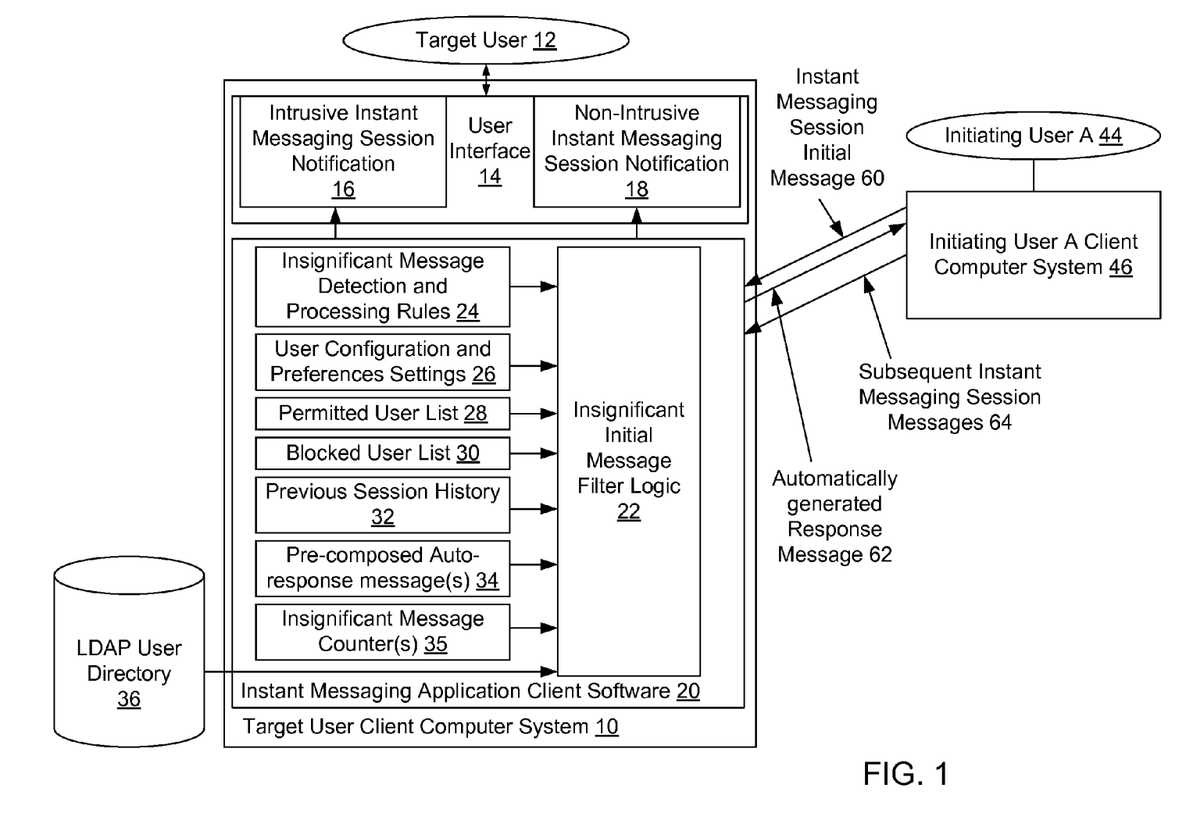
FIG. 1 is a block diagram showing hardware and software components in an illustrative embodiment of the disclosed system.

FIG. 1 is a block diagram showing software and hardware components in an illustrative embodiment of the disclosed system. As shown in FIG. 1, software and hardware components in an illustrative embodiment of the disclosed system include a target user client computer system 10 associated with target user 12. The target user client computer system 12 includes a user interface 14 through which an intrusive instant messaging session notification and a non-intrusive instant messaging session notification 18 are provided to the target user 12. The user interface 14 is generated at least in part by the instant messaging application client software 20 executing on the target user client computer system 10. The user interface 14 may be any specific type of interactive user interface, such as, for example, a graphical user interface including multiple, movable application windows and icons. The user interface 14 may be navigated using any specific type of user interface device, such as a computer keyboard or mouse, and/or using voice commands or the like.

In the example of FIG. 1, an initial instant message 60 is sent on behalf of the initiating user A 44 by the initiating user A client computer system 46, in order to start a new instant messaging session between the initiating user A 44 and target user 12. The initial instant message 60 may be formatted and/or communicated consistent with any specific public or proprietary instant messaging protocol and/or service, as appropriate for a given embodiment of the disclosed system, such as, for example, XMPP (EXtensible Messaging and Presence Protocol), IRC (Internet Relay Chat), and the like.

The intrusive instant messaging session notification 16 is generated by the instant messaging application client software 20 in response to receipt of the initial instant message 60, and further in response to a determination by the insignificant initial message filter logic 22 in the instant messaging application client software 20 that the initial instant message 60 includes significant content. The specific type of user notification provided in the intrusive instant messaging session notification 16 may be configurable by the target user 12, for example through the user configuration and preferences settings 26, or may be pre-set within the client software 20. For example, in one embodiment, the intrusive instant messaging session notification 16 may interrupt the target user 12 from whatever task he or she is performing at the time the initial instant message 60 is received. In such an embodiment, generation of the intrusive instant messaging session notification 16 by the instant messaging application client software 20 changes the current user interface "focus" to a new pop-up window display object or the like through which the new instant messaging session is provided to the target user 12. Since the current user interface focus controls which user interface display object (e.g. window, menu, dialog box etc.) is affected by key strokes or mouse movements performed by target user 12, changing the current user interface focus to the new pop-up window providing the new instant messaging system within the user interface 14 enables the target user 12 to immediately begin participating in the new instant messaging session. Such a newly generated pop-up up window in the intrusive session notification 16 also displays the contents of the initial instant message 60 to the target user 12.

The non-intrusive instant messaging session notification 18 is generated by the instant messaging application client software 20 in response to receipt of the initial instant message 60, and further in response to a determination by the insignificant initial message filter logic 22 in the instant messaging application client software 20 that the initial instant message 60 has insignificant content. The specific type of user notification provided in the non-intrusive instant messaging session notification 18 may be configurable by the target user 12, for example through the user configuration and preferences settings 26, or may be pre-set within the client software 20. In one embodiment, the non-intrusive session notification 18 does not interrupt the target user 12 from the task he or she is performing at the time the initial instant message 60 is received. In such an embodiment, generation of the non-intrusive instant messaging session notification 18 by the instant messaging application client software 20 does not change the current user interface focus from the current user interface window or other user interface display object in which they are working when the initial instant message 60 is received. Instead, a visual indication of the new instant messaging session, such as an icon or the like is displayed in a predetermined area of the user interface 14 such as a task bar or the like. The icon may be blinking, bold, or in some other way made visually prominent. The target user 12 can then click on the visual indication of the new instant messaging session in the non-intrusive instant messaging session notification 18 to begin participating in the new instant messaging session. Alternatively, or in addition, an audible notification may be provided through the non-intrusive instant messaging session notification 18, such as a beep or other sound. Significantly, the target user 12 is not forced to immediately begin participating in the new instant messaging session if the initial instant message 60 does not contain significant content. Those skilled in the art will recognize that an icon and/or audible signal are just two examples of how the disclosed system can be embodied to provide a non-intrusive instant messaging session notification, and that any other non-intrusive display or signal may be used in the alternative to these example non-intrusive notifications.

The determination of whether the initial instant message 60 has insignificant content may be based on a user configurable or pre-set set of inputs. The specific tests for whether a received initial instant message contains insignificant content may be defined by the target user 12, for example through the user defined insignificant message detection and processing rules 24. In one embodiment, the determination of whether the initial instant message 60 includes insignificant content is based on the number of words in the initial instant message 60. If the number of words is less than a user configured or pre-set threshold, then the initial instant message 60 is determined to contain insignificant content. Additionally, certain insignificant words may be excluded from the words counted in the initial instant message 60. For example, the set of insignificant words that are not counted might be configured or pre-set to include words such as "Hi", "Hello", and/or the name of the target user 12. Accordingly, if such a word count threshold is set, for example, at six (6), then initial instant message containing insignificant phrases such as "Hi", "Hello", "Are you there?", "Do you have a minute?", and the like would be determined to have insignificant content.

Alternatively, or in addition, the test for whether the initial instant message in a session contains insignificant content may be based on the identity of the user initiating the session. For example, the target user 12 may define a permitted user list 28 indicating certain users from which initial instant messages are never to be considered insignificant. This enables target user 12 to define a "white list" of users that are relatively important, and to which he or she wishes to respond immediately regardless of the significance or insignificance of the initial instant message content. Similarly, a blocked user list 30 may be defined indicating certain users from which initial instant messages are always to be considered insignificant. This enables target user 12 to define a "black list" of users that are relatively unimportant, and whose initial instant messages are always to be determined to have insignificant content. Alternatively, a list of users such as the blocked user list 30 may be used to identify the set of users from whom received initial instant messages are to always be checked for insignificant content, whereas initial instant messages from all other users are to always be determined to include significant content.

Previous instant messaging session history 32 may also, or alternatively, be used when determining whether the initial instant message 60 includes insignificant content. Based on such session history, the disclosed system may be embodied to learn which initiating users are likely to send initial instant messages that have insignificant content, and to handle subsequent initial messages from such users differently as a result. For example, if an initiating user attempts to initiate more than a configured or pre-set threshold number of instant messaging sessions by using an initial instant message that contains insignificant content, that may trigger an embodiment of the disclosed system to either begin checking all subsequent initial instant messages from that user for insignificant content, or to automatically determine that all subsequent initial instant messages from that user have insignificant content.

One or more pre-composed auto-response message(s) 34 may be selected or configured by target user 12 for automatic transmission to an initiating user in response to a determination that an initial instant message has insignificant content. This enables the target user 12 to pre-define a message including text requesting a significant message, such as "This is an auto-response to inform you that I have received your message. Please send me your specific question and I will attempt to answer it". Accordingly, in the case where the initial instant message 60 received from initiating user A 44 is determined to have insignificant content, the disclosed system would cause the automatically generated response message 62 to be transmitted to the initiating user A 44. The initiating user A 44 would then be caused provide a substantive message within the subsequent instant messaging session messages 64.

The disclosed system can further be embodied to check messages received subsequent to a first initial instant message in a session for insignificant content. In one embodiment, if the initiating user sends more than a user configured or pre-set threshold number of messages attempting to establish an instant messaging session with the target user 12, then the intrusive instant messaging session notification 16 is automatically generated. Until the threshold is reached, only the non-intrusive instant messaging session notification 18 is generated. In such an embodiment, the insignificant message counter(s) 35 are used to determine whether the threshold number of insignificant messages has been reached.

In another embodiment of the disclosed system, the determination of whether the initial instant message 60 has insignificant content may be alternatively or additionally responsive to a relationship between the target user 12 and the initiating user A 44 in a hierarchy of users. For example, the target user 12 and initiating user A 44 may both be employees of a business organization having a hierarchical structure. Such a hierarchical structure may be represented by a hierarchical database such as the LDAP (Lightweight Directory Access Protocol) user directory 36 shown in FIG. 1. Accordingly, when the initial instant message 60 is received, the relationship between target user 12 and initiating user A 44 in the business organization is checked in the LDAP user directory 36. If the target user 12 is below the initiating user A 44 in the business organization hierarchy, then the initial instant message 60 is determined to have significant content. In the case that target user 12 is at the same level as or above the initiating user A 44 in the business organization hierarchy, then the disclosed system operates to determine if the initial instant message 60 has insignificant content based on other factors, such as word count, etc.

The target user client computer system 10 and initiating user A client computer system 46 may each be embodied as any specific number of software processes and/or components executing on one or more hardware computer systems. Such computer systems may, for example, each consist of at least one processor, program storage, such as memory or other computer readable medium, for storing program code executable on the processor, one or more input/output devices and/or interfaces, such as data communication and/or peripheral devices and/or interfaces, and may each further include appropriate operating system software. The client computer systems 10 and 46 may be any specific type of computer system or other type of client device, such as, for example, desktop computer systems, PDAs (Personal Digital Assistants), cell phones, tablet PCs, or any other appropriate device capable of providing the user interface 14 to a user. The client computer systems 10 and 46 may be communicably connected using any specific type or kind of data communications network, including for example the Internet, a Local Area Network (LAN), or any other specific type of communication system or network.

Figure 2:
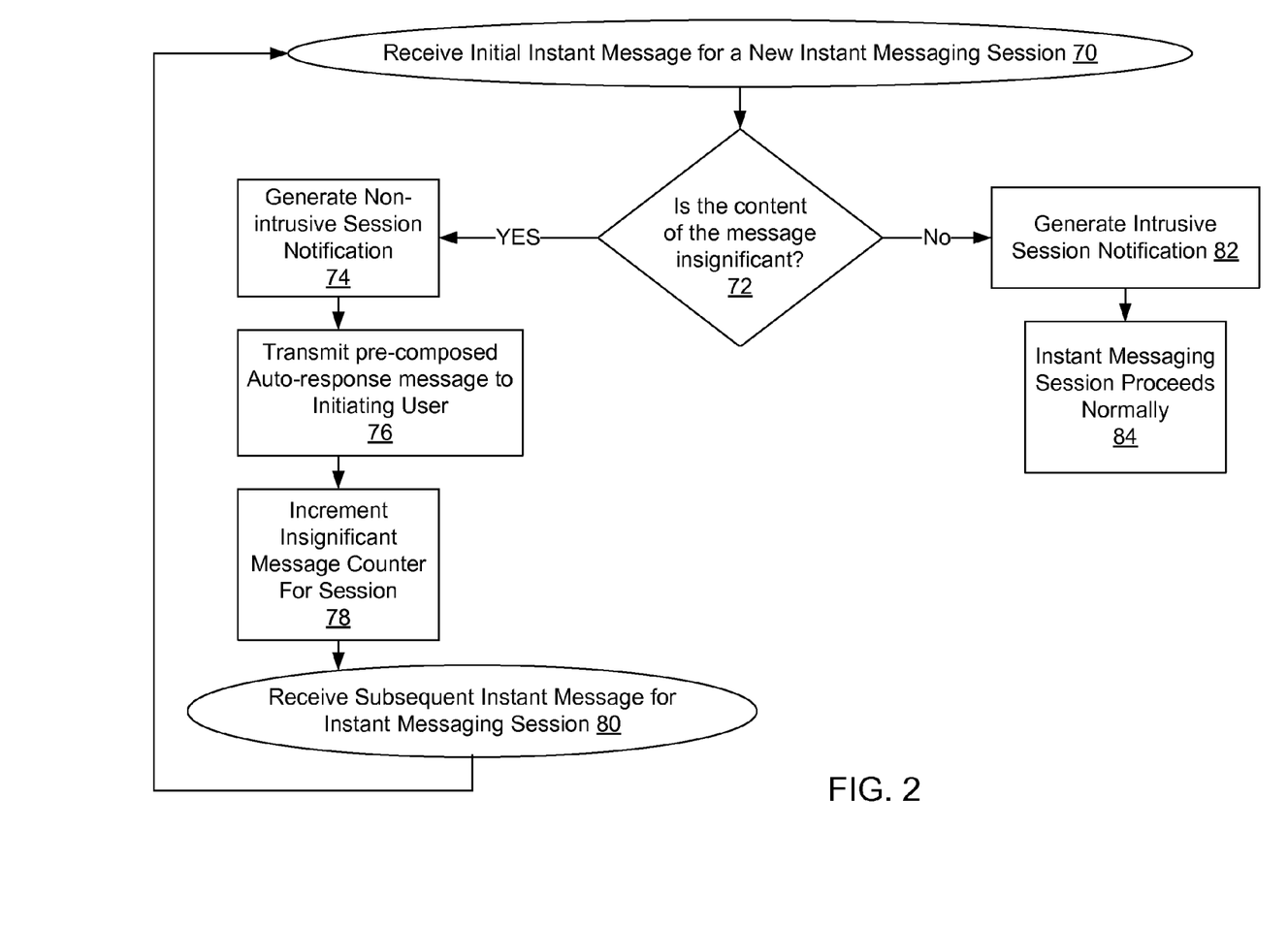
FIG. 2 is a flow chart showing steps performed during operation of an illustrative embodiment of the disclosed system.

FIG. 2 is a flow chart showing steps performed during operation of an illustrative embodiment of the disclosed system. In one embodiment, the steps of FIG. 2 are performed by the insignificant initial message filter logic 22 shown in FIG. 1.

As shown in FIG. 2, at step 70, an initial instant message is received for a new instant messaging session. The initial instant message received at step 70 is received by the client instant messaging software associated with a target user, and is generated and transmitted by an initiating user through client instant messaging software executing at a remote computer system. The initial instant message received at step 70 is the first message received for a new instant messaging session that the initiating user is attempting to establish between the initiating user and the target user.

At step 72, the disclosed system analyzes the content of the initial instant message received at step 70 to determine whether the content of the initial instant message is insignificant. The determination at step 72 may be responsive to rules defined by the target user, and/or configuration and preferences settings of the target user. The determination of whether the initial instant message is insignificant may be based on a number of attributes of the initial instant message, including, for example, the number of words in the initial instant message, the identity of the initiating user and whether the initiating user is listed in a permitted user list or blocked user list, previous instant messaging session history with the initiating user, a relationship between the target user and the initiating user within a hierarchy of users, the number of times the initiating user has previously sent instant messages having insignificant content attempting to establish the instant messaging session, and/or other factors.

If the initial instant message received at step 70 is determined to have insignificant content at step 72, then step 72 is followed by step 74, in which the disclosed system generates a non-intrusive instant messaging session notification. Otherwise, if the initial instant message received at step 70 is determined have significant content at step 72, then step 72 is followed by step 82 in which the disclosed system generates an intrusive instant messaging session notification. Step 82 is followed by step 84, in which the target user and the initiating user participate in an instant messaging session during which messages are not checked for insignificant content.

Step 74 is followed by step 76, in which the disclosed system automatically transmits a pre-composed auto-response message to the initiating user. The pre-composed auto-response message is automatically transmitted to the initiating user without action being taken by the target user. Thus the transmission of the pre-composed auto-response message may be completely transparent to the target user, and the target user is not interrupted in their work when the pre-composed auto-response message is automatically sent.

At step 78, the disclosed system increments a counter storing the number of insignificant initial instant messages received from the initiating user in attempting to establish the new instant messaging session with the target user. In one embodiment, if the number of insignificant initial instant messages received from the initiating user to establish the new instant messaging session with the target user exceeds a pre-set or user configured threshold, then a subsequently received instant message attempting to establish the new instant messaging with the target user is considered to have significant content, regardless of its actual content, and an intrusive instant messaging session notification is generated to the target user.

At step 80 a subsequent instant message is received for the instant messaging session that the initiating user is attempting to establish with the target user. In the embodiment of FIG. 2, the disclosed system checks the subsequent instant message received at step 80 to determine whether it has insignificant content, and follows the same flow as for the initially received instant message. However, the disclosed system may alternatively be embodied to only check the first message of a new instant messaging session for insignificant content. In such an alternative embodiment, step 80 would be followed by step 82.

In another embodiment of the disclosed system, the time taken to terminate an instant messaging session is also reduced by extending the determination of insignificant message content detection at step 72 of FIG. 2 to be responsive to pre-defined and/or user configurable insignificant farewell message content consisting of certain terms, expressions, and/or acronyms (e.g. "bye", "see ya", "ttyl" (talk to you later), "bfn" (bye for now), "thx" (thanks), or the like). For example, such insignificant farewell message content would not be counted towards a word count indicating the number of words in the received message, and therefore would not contribute to meeting any minimum message word count threshold needed to met for a received initial message to be considered significant. The disclosed system may further be embodied to operate based on more specific session termination rules, such as rules causing received instant messages containing only insignificant farewell content to be ignored. As a result, if the local user has previously closed an instant messaging session window containing a session, and then a subsequent message containing only insignificant farewell message content is received, that subsequent message may be handled as a special case of an initial message having insignificant content, and no alert indication of receipt of the message (e.g. new instant messaging window, icon in the taskbar, etc.) is generated. Such system behavior regarding instant messaging session termination may, for example, be defined through definition of one or more appropriate message processing rules (e.g. Insignificant Message Detection and Processing Rules 24 in FIG. 1) by the local user (e.g. Target User 12 in FIG. 1).

Figure 3:
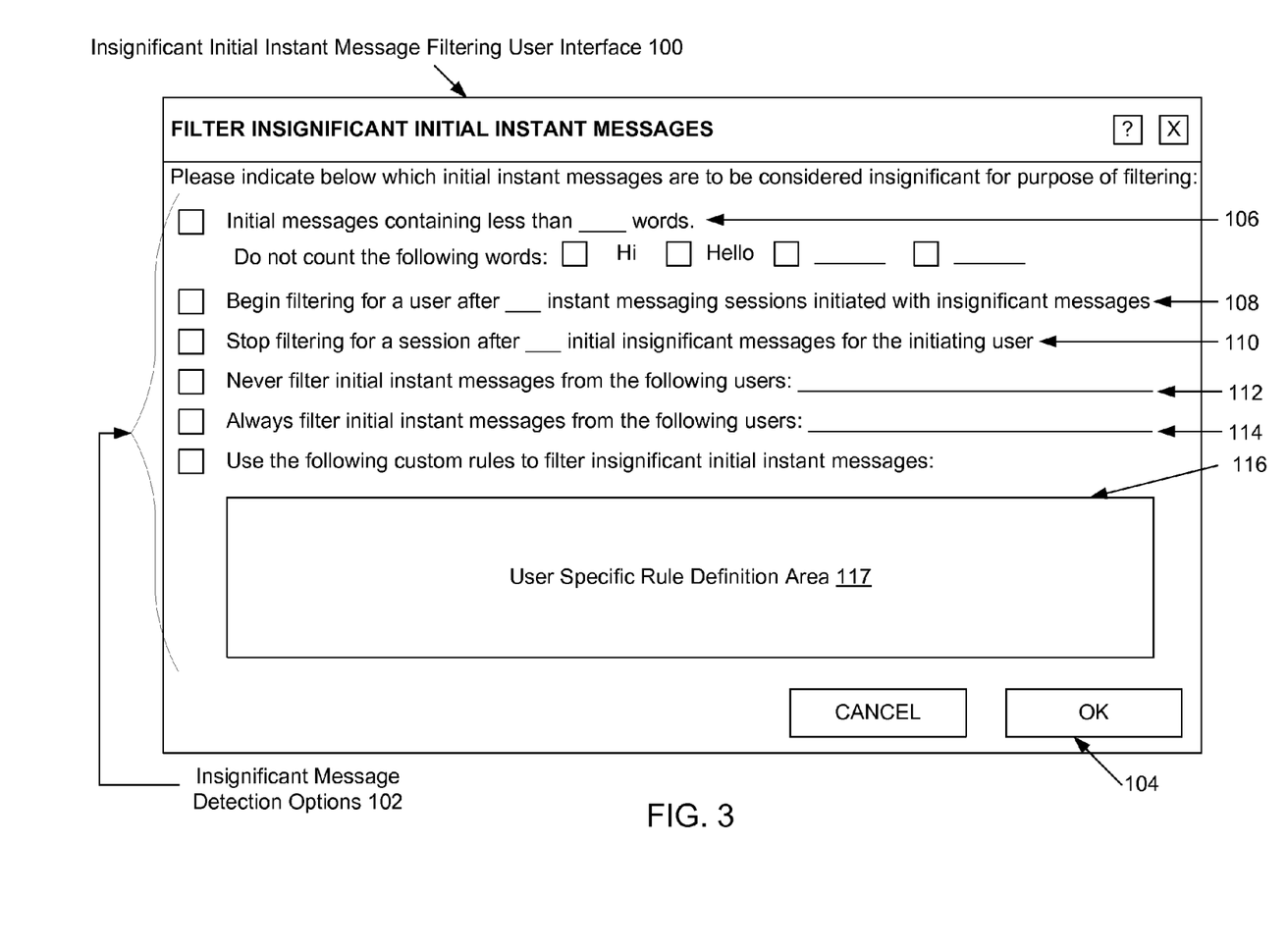
FIG. 3 is a portion of a user interface provided by an illustrative embodiment of the disclosed system to enable a user to indicate how initial instant messages in instant messaging sessions are to be determined to have insignificant content.

FIG. 3 shows an insignificant initial instant message filtering user interface 100, that allows a user, such as the target user 12 of FIG. 1, to indicate to an embodiment of the disclosed system how insignificant initial instant messages are to be detected. The user interface 100 of FIG. 3 includes a number of selectable insignificant message detection options 102. The illustrative insignificant message detection options 102 shown in FIG. 3 include a word count option 106, through which the user can indicate a threshold number of words that an initial instant message must contain to be considered significant. The word count option 106 further enables the user to indicate one or more words that are to be excluded from being counted when the number of words in the initial instant message is determined.

A user learning option 108 enables the user to indicate how many instant messaging sessions can be initiated by an initiating user using insignificant initial messages before the disclosed system begins checking initial instant messages received from that initiating user for insignificant content. This option, when selected, causes the disclosed system to apply insignificant initial message filtering selectively to initiating users that have previously shown a propensity for using initial messages with insignificant content.

A repeated attempts threshold option 110 enables the user to indicate a maximum number of received insignificant initial instant messages that can be determined to have insignificant content before an intrusive instant messaging notification is generated. This option, when selected, enables the user to prevent the disclosed system from completely blocking an initiating user that insists on using initial messages having insignificant content from starting a new instant messaging system.

A permitted users option 112 enables the user to indicate which initiating users are not to be blocked from using insignificant initial instant messages to start new instant messaging sessions. This option, when selected, allows the user to list important persons such as their boss, wife, etc., such that the disclosed system always generates an intrusive instant messaging session notification when an initial instant message is received from one of those important persons, regardless of whether the initial message contents is insignificant.

A blocked users option 114 enables the user to indicate which initiating users are to always be blocked from causing an intrusive instant messaging session notification to be generated. The blocked users option 114 enables the user to identify those users for whom responding is not time critical, such that the disclosed system always generates a non-intrusive instant messaging session notification when an initial instant message is received from one of those users. In an alternative embodiment, the blocked users option 114 enables the user to list the set of initiating users from whom initial instant messages are to be checked for insignificant content.

The user is permitted to define their own rules for determining which initial instant messages have insignificant content using the rule definition option 116, and can enter whatever rule or rules they desire, for example using predetermined keywords, text, and/or logic operators, within the user specific rule definition area 117.

When the user has selected or defined the options 102 that they desire to have applied by the disclosed system, they can press the "OK" button 104, and the options will be stored (e.g. in the rules 24 and/or settings 26 shown in FIG. 1) and applied during processing of received initial instant messages for new instant messaging sessions.

Figure 4:
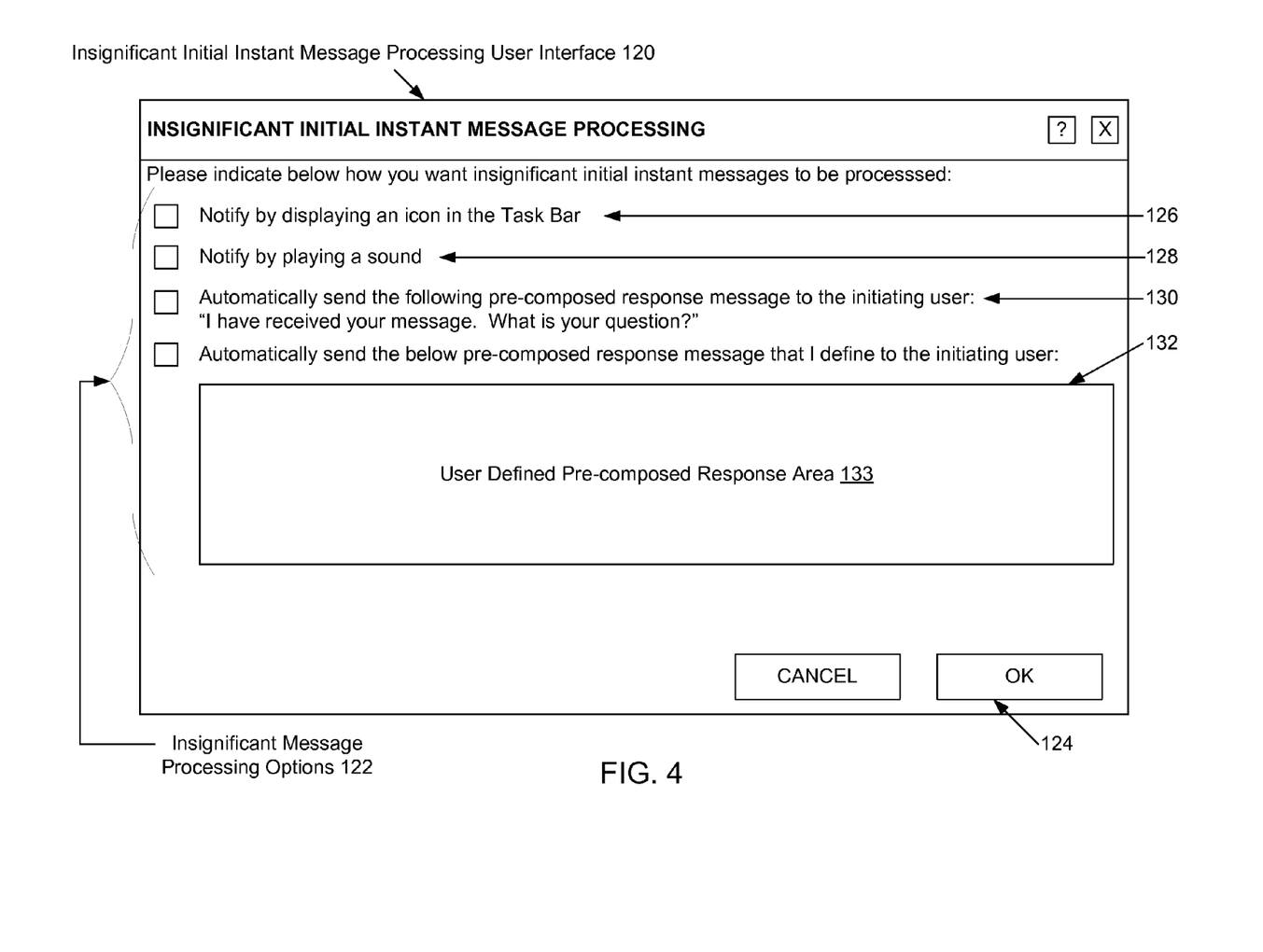
FIG. 4 is a portion of a user interface provided by an illustrative embodiment of the disclosed system to enable a user to indicate how initial instant messages in instant messaging sessions are to be handled if they have insignificant content.

FIG. 4 shows an insignificant initial instant message processing user interface 120, allowing a user, such as the target user 12 of FIG. 1, to indicate to an embodiment of the disclosed system how insignificant initial instant messages are to be processed. The user interface 120 of FIG. 4 includes a number of insignificant message processing options 122. The illustrative insignificant message processing options 122 shown in FIG. 4 include an icon notification option 126, that allows the user to cause the disclosed system to provide non-intrusive instant messaging session notifications consisting of or including displaying an icon display object representing the new instant messaging system in the user interface. A sound notification option 128 enables the user to cause the disclosed system to generate an audible sound as at least part of a non-intrusive instant messaging session notification.

An automatic response message option 130 enables the user to cause the disclosed system to automatically generate and send a pre-composed response message to an initiating user in response to a received initial instant message from that user having insignificant content. The text of the automatically generated response message consists of, for example, "I have received your message. What is your question?". The user can alternatively pre-compose the contents of the automatically generated response message by selecting the user defined automatic response message option 132, and entering the desired text into the user defined pre-composed response area 133. When the user has completed selection of the options to be used when processing initial instant messages that are determined to have insignificant content, the user can click on the "OK" button 124 to cause the selected options to be applied to subsequently received initial instant messages that are received and determined to have insignificant content.

Those skilled in the art will recognize that while the options in the illustrative user interfaces shown in FIGS. 3 and 4 are selectable through check box display objects, through which options can be selected by the user clicking on the corresponding check box to cause the check box to become "checked", the present invention is not so limited. Accordingly, a user interface for selecting options to be applied when either detecting and/or processing initial instant messages with insignificant content may be provided in alternative embodiments using any other appropriate user interface mechanism or display objects to enable the user to define and/or select the rules and/or settings that control how initial messages with insignificant content are detected and processed.

Figure 5:
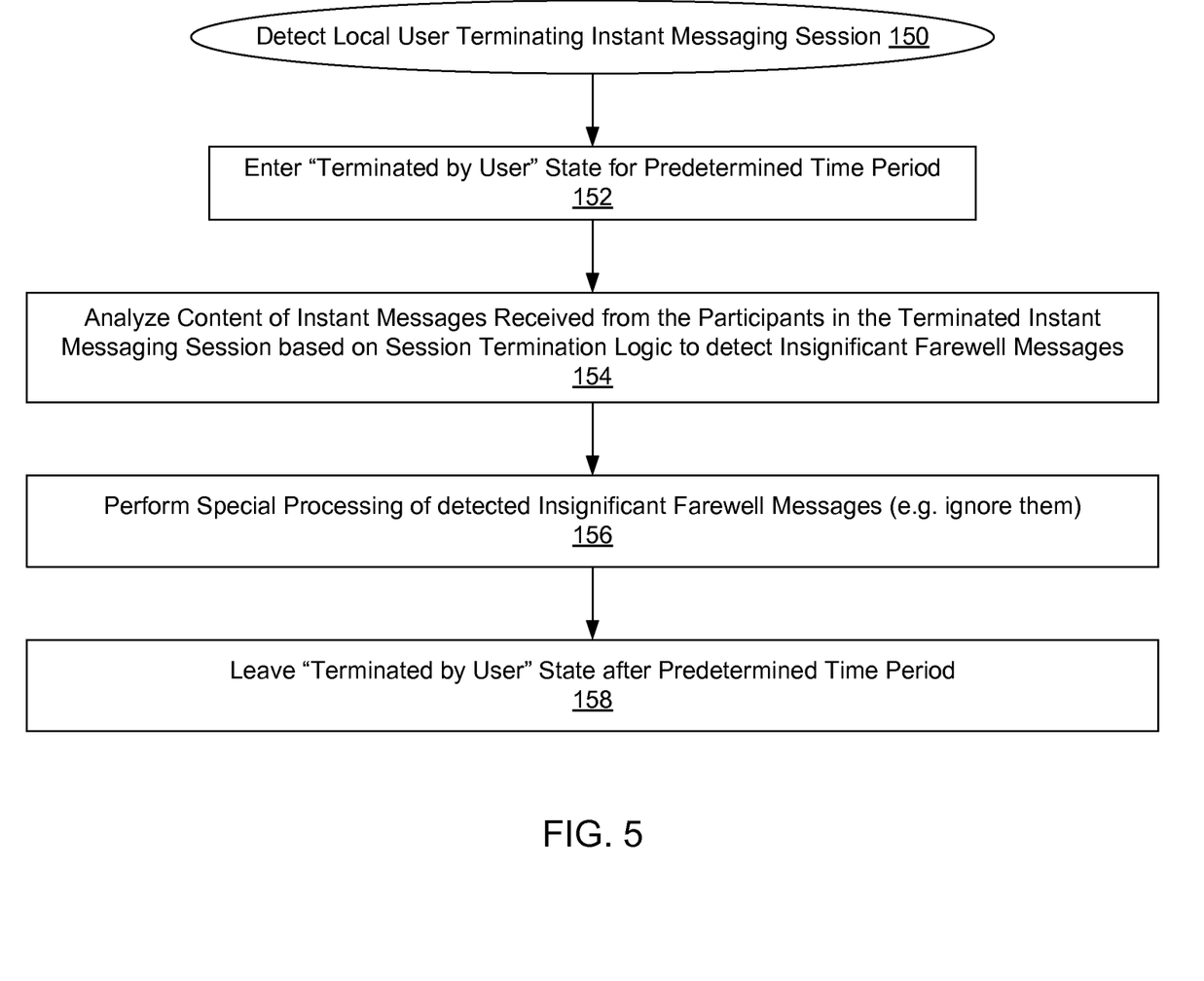
FIG. 5 is a flow chart showing steps performed by an illustrative embodiment of the disclosed system to limit time taken during instant messaging session termination.

As shown in FIG. 5, in another embodiment of the disclosed system, termination of an instant messaging session by the local user is detected at step 150, for example in response to the local user (e.g. Target User 12 in FIG. 1) closing a user interface window containing an instant messaging session. The steps of FIG. 5 are, for example, performed by the Insignificant Initial Message Filter Logic 22 shown in FIG. 1. When termination of an instant messaging session by the local user is detected at step 150, at step 152 the disclosed system enters a "terminated by user" state for a predetermined and/or user configurable time period (e.g. a few seconds or minutes). During the "terminated by user" state, at step 154, the disclosed system analyzes the content of instant messages received from the participants in the just terminated instant messaging session based on session termination logic. In one embodiment, the session termination logic consists of a special set of session termination rules contained in the Insignificant Message Detection and Processing Rules 24 shown in FIG. 1. At step 154, session termination logic used during the "terminated by user" state entered at step 152 checks instant messages received from other participants in the instant messaging session terminated at step 150 for insignificant farewell content, such as user-specified or pre-configured insignificant farewell terms, expressions, and/or acronyms. The presence of insignificant farewell content in a message at step 152 triggers special handling of that message as an insignificant farewell message at step 156.

Session termination processing performed at step 156 may, for example, include ignoring messages received from participants in the terminated instant messaging session that include only insignificant farewell content, not counting insignificant farewell content towards a minimum message word count in messages received from the participants in the terminated instant messaging session, and/or transmitting a special termination related auto-response message (e.g. one of Pre-composed Auto-response Message(s) 34 informing the sender that the local user has changed his or her attention to a different task). Other appropriate session termination related actions may also or alternatively performed in response to receipt of insignificant farewell messages from the participants in the terminated instant messaging session until the "terminated by user" state is exited after the predetermined time period at step 158.

The present invention can be realized in hardware, software, or a combination of hardware and software. A system according to the present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software could be a general purpose computer system with a computer program that, when being loaded and executed, controls the computer system such that it carries out the methods described herein.

The figures include block diagram and flowchart illustrations of methods, apparatus(s) and computer program products according to an embodiment of the invention. It will be understood that each block in such figures, and combinations of these blocks, can be implemented by computer program instructions. These computer program instructions may be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable medium or memory that can direct a computer or other programmable data processing apparatus to function in a particular manner, such that the instructions stored in the computer-readable medium or memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art should readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer through communication media for example using wireless, baseband signaling or broadband signaling techniques, including carrier wave signaling techniques, such as over computer or telephone networks via a modem.

While the invention is described through the above exemplary embodiments, it will be understood by those of ordinary skill in the art that modification to and variation of the illustrated embodiments may be made without departing from the inventive concepts herein disclosed.

We claim:

1. A method for minimizing the time required to initiate an instant messaging session, comprising:
    receiving an initial instant message for a new instant messaging session;
    counting a total number of words contained in said initial instant message, wherein said counting said total number of words contained in said initial instant message does not count at least one predetermined word indicated by a target user to be excluded from said counting;
    determining, responsive to said total number of words contained in said initial instant message, whether said initial instant message has insignificant content, such that if said total number of words contained in said initial instant message is less than a threshold total number of words then said initial instant message is determined to contain insignificant content;
    in the event said initial instant message is determined to have insignificant content, providing a first type of notification to said target user; and
    in the event that said initial instant message is determined to have significant content, providing a second type of notification to said target user.

2. The method of claim 1, further comprising:
    wherein said first type of notification is non-intrusive with regard to a current activity of said target user; and
    wherein said second type of notification is intrusive with regard to said current activity of said target user.

3. The method of claim 1, further comprising:
    wherein said first type of notification leaves a current user interface focus undisturbed; and
    wherein said second type of notification changes said current user interface focus.

4. The method of claim 1, wherein said first type of notification includes presenting an icon representing said new instant messaging session in said user interface.

5. The method of claim 1, wherein said first type of notification includes generating an audible notification.

6. The method of claim 1, further comprising:
    wherein said second type of notification includes presenting a new user interface window for said new instant messaging session.

7. The method of claim 6, further comprising:
    wherein said second type of notification includes changing a current focus of said user interface to said new user interface window for said new instant messaging session.

8. The method of claim 1, further comprising:
    in the event said initial instant message is determined to have insignificant content, automatically transmitting a pre-composed response message to an initiating user having sent said initial instant message, wherein said pre-composed response message requests another instant message be sent from said initiating user having significant content.

9. The method of claim 1, wherein said determining whether said initial instant message has insignificant content is performed responsive to determining that an initiating user having sent said initial instant message is listed in a blocked user list.

10. The method of claim 1, further comprising:
    wherein said determining whether said initial instant message has insignificant content is performed responsive to determining that previous session history indicates that an initiating user having sent said initial instant message has sent more than a threshold number of initial instant messages having insignificant content in previous instant messaging sessions.

11. The method of claim 1, further comprising:
    wherein said second type of notification is provided in the event that a count of previously received initial instant messages for said new instant messaging session having insignificant content exceeds a threshold.

12. The method of claim 1, further comprising:
    wherein said determining whether said initial instant message has insignificant content is performed responsive to a relationship between said target user and an initiating user in a user hierarchy, said initiating user having sent said initial instant message, wherein said initial instant message is determined to have significant content in the event that said initiating user is higher in said user hierarchy than said target user.

13. A computer system having hardware including a computer readable memory, at least one processor communicably coupled to the computer readable memory, said computer readable memory having program code stored thereon, said program code, when executed by said at least one processor, minimizing the time required to initiate an instant messaging session, said program code comprising:
    program code for receiving an initial instant message for a new instant messaging session;
    program code for counting a total number of words contained in said initial instant message, wherein said counting said total number of words contained in said initial instant message does not count at least one predetermined word indicated by a target user to be excluded from said counting;
    program code for determining, responsive to said total number of words contained in said initial instant message whether said initial instant message has insignificant content, such that if said total number of words contained in said initial instant message is less than a threshold total number of words then said initial instant message is determined to contain insignificant content;
    program code for, in the event said initial instant message is determined to have insignificant content, providing a first type of notification to said target user; and
    program code for, in the event that said initial instant message is determined to have significant content, providing a second type of notification to said target user.

14. A non-signal computer readable storage medium, said non-signal computer readable storage medium having program code stored thereon, said program code, when executed by at least one processor, minimizing the time required to initiate an instant messaging session, said program code comprising:
    program code for receiving an initial instant message for a new instant messaging session;
    program code for counting a total number of words contained in said initial instant message, wherein said counting said total number of words contained in said initial instant message does not count at least one predetermined word indicated by a target user to be excluded from said counting;
    program code for determining, responsive to said total number of words contained in said initial instant message, whether said initial instant message has insignificant content, such that if said total number of words contained in said initial instant message is less than a threshold total number of words then said initial instant message is determined to contain insignificant content;

program code for, in the event said initial instant message is determined to have insignificant content, providing a first type of notification to said target user; and program code for, in the event that said initial instant message is determined to have significant content, providing a second type of notification to said target user.

* * * * *